United States Patent [19]

Berndt

[11] Patent Number: 4,741,222

[45] Date of Patent: May 3, 1988

[54] MANUAL SHIFTING DEVICE

[76] Inventor: Thomas J. Berndt, 511 Schuler Grade, Yakima, Wash. 98908

[21] Appl. No.: 57,611

[22] Filed: Jun. 3, 1987

[51] Int. Cl.⁴ .................. G05G 11/00; G05G 1/14
[52] U.S. Cl. .................................. 74/481; 74/474; 74/525; 180/315; 403/97; 403/396
[58] Field of Search .............. 74/474, 481, 525; 180/315; 403/97, 396

[56] References Cited

U.S. PATENT DOCUMENTS

| 926,426 | 6/1909 | Koch et al. ............... 403/97 X |
| 1,335,631 | 3/1920 | Youmans .................... 74/481 |
| 1,342,372 | 6/1920 | Carmody ..................... 74/481 |
| 1,593,338 | 7/1926 | Kipp ............................ 74/481 |
| 2,094,163 | 9/1937 | Weber .......................... 74/481 |
| 2,901,918 | 9/1959 | Beamer ..................... 74/481 X |
| 3,850,048 | 11/1974 | Moore ...................... 74/481 X |

FOREIGN PATENT DOCUMENTS 208817 6/1957 Australia ...................... 403/396
565622 11/1932 Fed. Rep. of Germany ...... 403/396

Primary Examiner—Allan D. Herrmann
Attorney, Agent, or Firm—Seed and Berry

[57] ABSTRACT

An improved foot-operated gearshift mechanism wherein a foot-operated pedal is operable to cause the pedal to move, generally, up or down. This movement, in turn, causes the gear-shift shaft to rotate so as to change gears. The improvement lies in providing a shifting lever assembly which has three sections. The first section is attached to the foot-operated pedal at one end and has an elbow at the other end. The second section proceeds to a second elbow. From that second elbow, the third section continues to a gearshift handle.

6 Claims, 3 Drawing Sheets

FIG.3
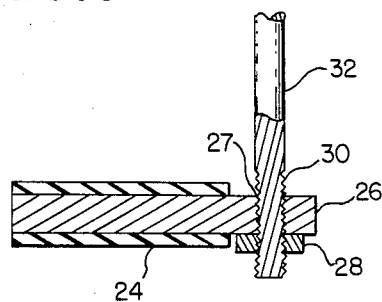
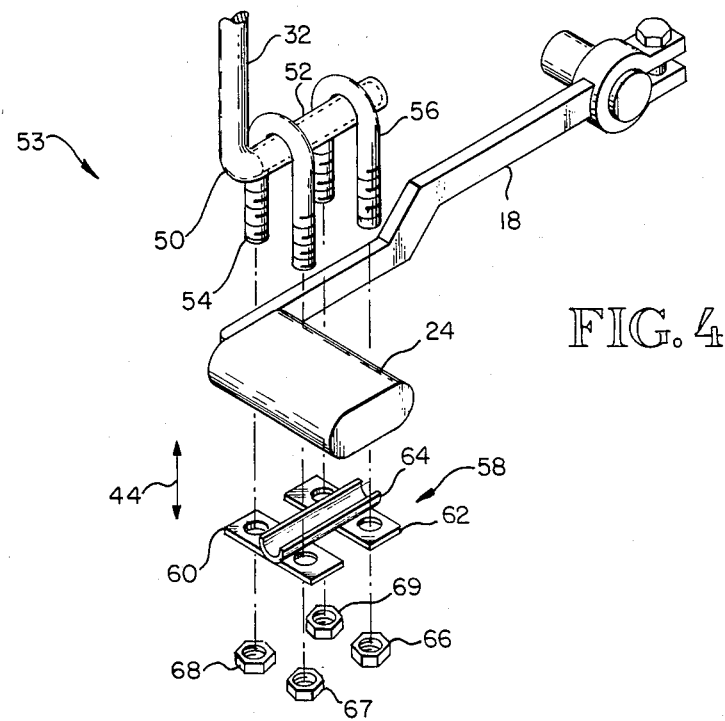
FIG.4

MANUAL SHIFTING DEVICE

DESCRIPTION

1. Technical Field

The present invention relates to shifting devices for motorized vehicles, and more particularly, to manually operated shifting levers for use in conjunction with foot-operated shift levers.

2. Background Art

In recent years the use of all-terrain vehicles (ATVs) has grown. As their use has grown, so too has the technology used in their design and construction. It has been common practice to use gearboxes that employ a clutch which is manually operated. Such a clutch is normally operated by pulling a lever located on one handlebar of the ATV. The opposite handlebar normally has provided another lever for the operation of the brakes.

The gears themselves are normally operated by a foot pedal located adjacent to the foot rest on the same side of the ATV as the clutch, typically the left side of the vehicle. This lever is connected by a mechanical link to the gearbox.

With the advent of the centrifugal clutch and its application to ATVs, motorcycles and other similar vehicles, there is no longer a need for a clutch lever on the handlebar of the ATV to engage or disengage the clutch. The absence of this clutch lever frees on of the driver's hands to perform other functions such as actuation of a brake handle.

3. Disclosure of Invention

The present invention allows the rider to shift gears manually rather than by urging the foot pedal with the rider's leg. Such an arrangement has several advantages, for instance, allowing riders, without using the leg or foot for shifting as now needed, to operate ATVs and other vehicles which have a foot- operated shift pedal. In addition, all riders would now be able to use the foot normally used for shifting for other purposes, such as steadying the ATV during operation. Furthermore, handicapped persons having reduced mobility of the foot or leg which would otherwise operate the foot pedal can now enjoy the use of such vehicles.

The above-described uses, purposes and advantages of the present invention are realized by the provision of a manually operable shifting lever connected to the foot-operated shift lever of an ATV.

In the preferred embodiment the shifting lever is formed of a single continuous bar or rod, which is bent to define three sections. The first section is fixed to the foot-operated shift lever. It is perpendicular to the foot-operated shift lever and extends in a direction toward the driver's position on the ATV. The second portion of the shifting lever is defined by a first 80° bend at the end of the first section and by a second 80° bend at the beginning of the third section. The third section is substantially parallel to the first section and extends from the second section in a direction toward the driver's position on the ATV. The third section terminates in a shift-handle to allow for convenient manipulation of the shifting lever by the driver.

The present invention further contemplates the provision of a mechanism to removably connect the shifting lever to the foot-operated shift lever.

Still further, the present invention contemplates the provision of an articulation mechanism disposed in the third section of the shifting lever to allow for an additional degree of freedom in the shifting lever assembly.

BRIEF DESCRIPTION OF DRAWINGS

FIG. 3 is a cross-sectional view of a first means for attaching the embodiment of the invention shown in FIG. 2 to the foot-operated pedal.

FIG. 4 is an exploded view of a second means for removably attaching an embodiment of the invention to a foot-operated pedal.

BEST MODE FOR CARRYING OUT THE INVENTION

Figure 1:
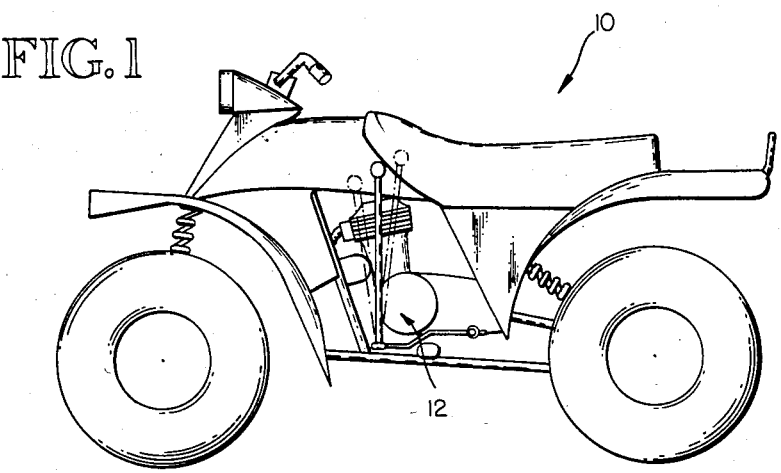
FIG. 1 is an isometric view of an ATV incorporating one embodiment of the invention.

FIG. 1 is an environmental view of the present invention showing the shifting lever assembly 12 in use in a conventional all-terrain vehicle (ATV) 10. It should be noted that while the invention is shown and described herein in reference to an ATV, the present invention has application in any motorized vehicle utilizing a foot-operated pedal for shifting gears.

Figure 2:
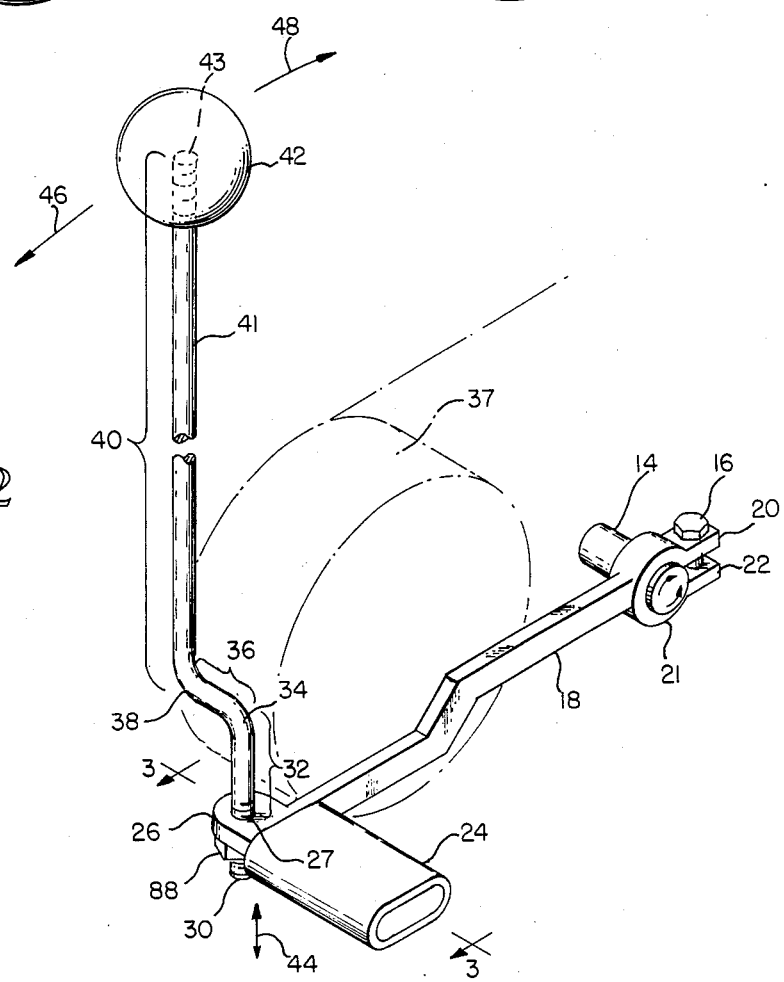
FIG. 2 is an isometric view of one embodiment of the invention shown in conjunction with a foot-operated pedal.

FIG. 2 is an isometric view of one embodiment of the shifting lever assembly 12 of the present invention shown in conjunction with a foot-operated pedal 24.

In a conventional operation the foot-operated pedal 24 is caused to move up and down (or arcuately), as indicated by the double-headed arrow 44, by the driver's manipulation of the foot-operated pedal 24 with his or her foot. Movement of the foot-operated pedal 24 causes a corresponding movement to a mechanical link 18. The mechanical link 18 is frictionally attached to a shaft 14 by drawing clamping ears 20 and 22 into frictional engagement with the shaft 14. Such engagement can be accomplished by drawing clamping ears 20 and 22 together by fastening means 16, for example, a screw.

It can be appreciated that movement of mechanical link 18 up or down, in the direction of the double-headed arrow 44, will cause shaft 14 to rotate as indicated by arrows 21. Shaft 14 is operably linked to a gearbox, not shown. Rotation of the shaft 14 in a selected direction and extent causes a selection of a desired gear combination or ratio in the gearbox, not shown.

Movement of the foot-operated pedal 24 in the direction of the double-headed arrow 44, and the corresponding rotation of the shaft 14 as shown by the arrows 21, can also be accomplished by moving the shifting lever assembly 12.

The shifting lever assembly 12 includes a single continuous rod or tube 41 formed into a characteristic configuration as described hereinbelow. The first section 32 has at one end of thereof a threaded portion 30 and at the other end thereof a 80° elbow 34. The threaded portion 30 has external threads that correspond to internal threads in a threaded bore 27 through an ear 26 formed as an integral part of the foot-operated pedal 24. The threaded portion 30, as shown in FIG. 2, is screwed into the threaded bore 27 and when the desired depth and position are obtained, as described below, the entire shifting lever assembly 12 can be locked into position by, for example, a locking nut 28.

The second section 36 of the shifting lever assembly 12 is defined by the first 80° elbow 34 at one end thereof and a second 80° elbow 38 at the other end. The third section 40 of the shifting lever assembly 12 is defined by the second 80° elbow 38 at one end and a termination 43 at the other end. The termination 43 may be provided with, for example, a shift handle 42 for ease of manipulation of the shifting lever assembly 12 by the driver of the ATV. Movement of the shift handle in the direction of arrows 46, 48 causes corresponding rotation of the shaft 14 in the direction of arrows 21.

The length of the first section 32 and the second section 36 is determined by several factors. First, ensuring that the crankcase 37, gas tank (not shown), or other operating equipment or accessories on the ATV are not interfered with by the shifting lever assembly 12 when operating it. Second, the second section 36 is made sufficiently long to ensure that the third section 40 is as close to the frame and engine (not shown) of the ATV as practicable. Thus, the likelihood of the shifting lever assembly 12 striking brush, trees or other similar obstacles during operation of the ATV is reduced.

Positioning of the shifting lever assembly 12 is further facilitated by loosening the lock nut 28 and rotating the entire shifting lever assembly 12 about an axis defined by the first section 32. FIG. 3 further illustrates how this can be accomplished. Loosening lock nut 28 allows the threaded portion 30 of the first section 32 to be threaded in or out of the threaded bore 27. Thus, the first section 32 can be rotated in either direction relative to the ear 26, hence relative to the foot-operated pedal.

The foregoing embodiment of the invention has applications where the shifting lever assembly 12 is to be included as original equipment by the ATV manufacturer. Where, however, such an assembly was not provided as original equipment, it can be fabricated and assembled to the ATV in a manner shown in FIG. 4.

FIG. 4 is an exploded view of a second embodiment of the invention including a mount 53. The mount removably attaches the first section 32 to the foot-operated pedal 24. The operation of the foot-operated pedal 24 and associated mechanical link 18 is identical to that described in reference to FIG. 2.

The first section 32 of the shifting lever assembly 12 has, instead of the threaded portion 30 shown in FIGS. 2 and 3, a 90° elbow 50 and a lug 52. The lug 52 is secured to the mechanical link 18 by, for example, threaded U-bolts 54 and 56. The threaded U-bolts are held fast against the lug 52 by a clamping bracket 58 and nuts 66–69 disposed opposite the mechanical link 18 from the lug 52. The clamping bracket includes two strips 60 and 62 having holes therein corresponding to the threaded portions of the U-bolts 54 and 56. Attached to one side of the strips 60 and 62, by, for example, spot welding, is a trough 64. The trough 64 establishes a spaced relation between the two strips 60 and 62 and when the mount 53 is assembled to the mechanical link 18 the trough engages the mechanical link and establishes a fixed spaced relation between the U-bolts 54 and 56 and between the lug 52 and the mechanical link 18.

It is often desirable to provide for flexibility in the spatial location of the shift handle 42 shown in FIG. 2. To accomplish this an additional degree of freedom to that provided by the shifting lever assembly 12 of FIG. 2 is desirable. That additional degree of freedom can be provided by the articulating device 75 of FIGS. 5 and 6.

Figure 5:
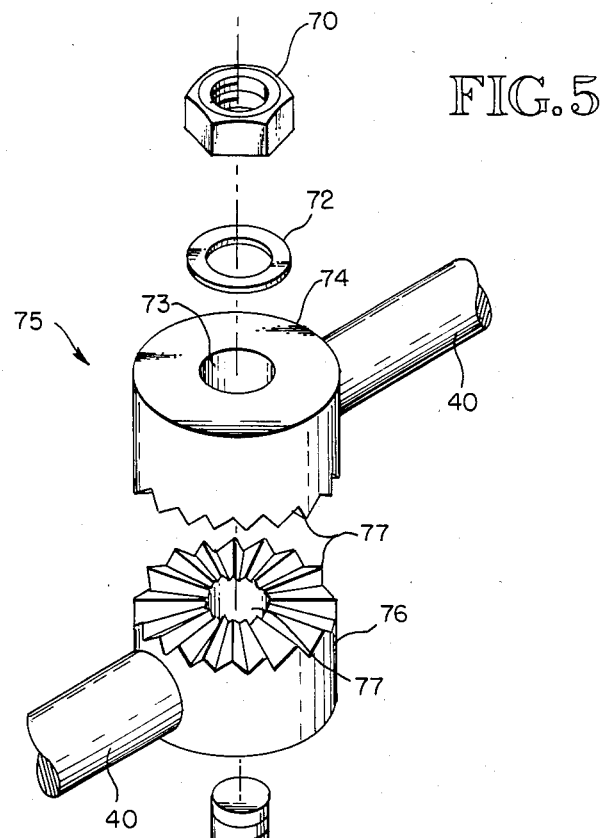
FIG. 5 is an exploded view of an articulating mechanism to provide an additional degree of freedom to the invention.
Figure 6:
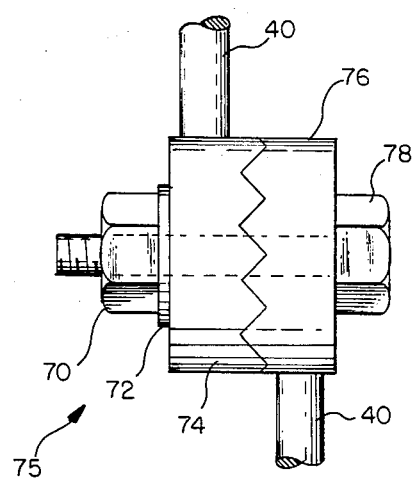
FIG. 6 is an assembled view of the articulating mechanism of FIG. 5.

The third section 40 of the shifting lever assembly 12 of FIG. 1 can be cut and rejoined by the articulating device 75 of FIGS. 5 and 6.

The articulating device 75 includes two serrated jaws 74 and 76. Each serrated jaw 74, 76 includes a plurality of teeth 77 which serve to hold the two jaws 74, 76 in fixed angular relation to each other when they are in contact.

In this way the relative angular position of the two jaws 74, 76, hence the relative angular position of the two portions of the third section 40, can be established so as to place the shift handle 42, shown in FIG. 1, in its desired position. Once this desired position is established, the relative angular position of the serrated jaws 74, 76 is locked by fixing the serrated jaws 74, 76 together and inserting through bores 73 and 77, respectively, a bolt 78 which is held in place by a nut 70 and washer 72.

While a specific embodiment of a manual shifting device has been disclosed in the foregoing description, it will be understood that various modifications within the spirit of the invention may occur to those skilled in the art. Therefore, it is intended that no limitations be placed on the invention except as defined by the scope of the appended claims.

I claim:

1. An improved foot-operated gearshift mechanism includes a foot-operated pedal which is operable to be moved arcuately in two directions, a mechanical link attached to one end thereof of said foot-operated pedal and the other end thereof operably connected to a shaft to translate the arcuate movement of said foot-operated pedal to rotational movement of said shaft, the improvement comprising:

a first section defining a first end for a shifting lever assembly, the first end being fixed to said foot-operated pedal;

a second section for the shifting lever assembly, defining a first elbow with the first section; and a third section for the shifting lever assembly defining a second elbow with the second section and defining a second end for the shifting lever assembly wherein said first section and said third section are substantially parallel to each other and extend away from said foot-operated pedal.

2. An improved foot-operated gearshift mechanism as claimed in claim 1, which further comprises:

said first end being threaded;

said foot-operated pedal having a threaded bore therethrough to engage the threaded portion of said first end; and a locking nut to engage the threads of the threaded portion of said first end that extends through said foot-operated pedal when said first end extends through said threaded bore through said foot-operated pedal.

3. An improved foot-operated gearshift mechanism as claimed in claim 1 which further comprises:

said third section being divided into first and second portions; and articulating means for joining and for selectively positioning said first and said second portions to establish an angular relationship therebetween.

4. An improved foot-operated gearshift mechanism as claimed in claim 3 wherein said articulating means comprises:

a first serrated jaw joined to said first portion;

a second serrated jaw joined to said second portion;

said first and second jaws having equal diameter bores therethrough and teeth of equal pitch;

a bolt insertable through the equal diameter bores in said first and second jaws; and a nut in cooperative engagement with said bolt to draw together said first and second jaws so that the teeth in said first and second jaws are in cooperative engagement to hold said first and second jaws in a fixed angular relationship.

5. An improved foot-operated gearshift mechanism as claimed in claim 1 which further comprises:

said first end including a third elbow and a lug opposite said third elbow, said lug being substantially parallel to said mechanical link; and holding means for holding said lug in a fixed angular and spaced relationship relative to said mechanical link.

6. An improved foot-operated gearshift mechanism as claimed in claim 5 wherein said holding means includes:

a trough disposed to engage a side of said mechanical link opposite said lug;

two transverse strips affixed to said trough, each of said strips having bores therethrough at opposite ends thereof;

two threaded U-bolts, the apex of each of said threaded U-bolts contacting said lug and the threaded portions of said U-bolts passing through the bores in said two strips; and four nuts to cooperatively engage said threaded portions of said U-bolts to draw lug to fixed engagement with said mechanical link.

* * * * *